United States Patent [19]

Struger et al.

[11] Patent Number: 5,285,376
[45] Date of Patent: Feb. 8, 1994

[54] FUZZY LOGIC LADDER DIAGRAM PROGRAM FOR A MACHINE OR PROCESS CONTROLLER

[75] Inventors: Odo J. Struger, Chagrin Falls; Ernst Dummermuth, Chesterland, both of Ohio; Greggory Cieslak, Greendale, Wis.

[73] Assignee: Allen-Bradley Company, Inc., Milwaukee, Wis.

[21] Appl. No.: 782,851

[22] Filed: Oct. 24, 1991

[51] Int. Cl.$^5$ .............................................. G05B 9/02
[52] U.S. Cl. ..................................... 364/147; 395/12; 395/76; 364/140
[58] Field of Search ...................... 364/147, 146, 140; 395/3, 900, 12, 76

[56] References Cited

U.S. PATENT DOCUMENTS

| | | | |
|---|---|---|---|
| 4,158,226 | 6/1979 | Struger et al. | 364/104 |
| 4,302,820 | 11/1981 | Struger et al. | 364/900 |
| 4,443,865 | 4/1984 | Schultz et al. | 364/900 |
| 4,648,044 | 3/1987 | Hardy et al. | 364/513 |
| 4,752,889 | 6/1988 | Rappaport et al. | 395/12 |
| 4,866,634 | 9/1989 | Reboh et al. | 395/76 |
| 4,965,741 | 10/1990 | Winchell et al. | 364/513 |
| 4,982,358 | 1/1991 | Tanaka et al. | 364/147 |
| 5,012,430 | 4/1991 | Sakurai | 364/513 |
| 5,042,002 | 8/1991 | Zink et al. | 364/900 |
| 5,051,932 | 9/1991 | Inoue et al. | 395/900 X |
| 5,072,356 | 12/1991 | Watt et al. | 364/140 |
| 5,126,956 | 6/1992 | Komiya et al. | 364/147 |

FOREIGN PATENT DOCUMENTS 3109605  5/1991  Japan ................................. 364/147

OTHER PUBLICATIONS

Stephen L. Chiu, "InControl Version 1.4 User's Guide", Rockwell International Science Center, Feb. 1991, pp. 1-18.

Michio Sugeno, "An Introductory Survey of Fuzzy Logic", Inf. Science Article Tokyo Institute of Tech., Elseyier Sc. Publ. Co., 1985, pp. 59-83.

Chiu & Chand, "Fuzzy Controller Design and Stability Analysis for an Aircraft Model", Rockwell Int'l. Science Center, Aug., 1991.

L. P. Holmblad 7 J. J. Ostergaard, "Control of a Cement Kiln by Fuzzy Logic" Disclosure, F. L. Smith & Co., North Holland Publ. Co., 1982, pp. 389-399.

Dr. M. Abdelrahman, "Fuzzy Sensors for Fuzzy Logic" Article, Eaton Corp. Logic Control Div., Mil., WI, Control Engineering, Dec., 1990, pp. 50-51.

Kevin Self, "Designing with Fuzzy Logic" Article, IEEE Spectrum, Nov., 1990, p. 42.

"Fuzzy Logic Brewing at Omron" Article, Jul./Aug. 1990 Programmable Controls.

Lotti A. Zadeh, "Fuzzy Logic", University of CA—Berkley, IEEE Computer, Apr., 1988.

Donald Baechtel, Chia Day, S. Chand, "A Fuzzy Logic Based Tuner for Proportional Integral Derivative Controllers", U.S. Postal Conf., Washington, D.C., Jul. 1990.

Primary Examiner—Jerry Smith
Assistant Examiner—Brian C. Oakes

[57] ABSTRACT

Fuzzy logic programming is provided for machine and process controllers. New input and output instructions are devised for ladder diagram programming, as well as methods of downloading fuzzy logic instructions from a programming terminal to a programmable controller processor and methods for executing such instructions in the programmable controller processor.

17 Claims, 7 Drawing Sheets

FUZZY LOGIC LADDER DIAGRAM PROGRAM FOR A MACHINE OR PROCESS CONTROLLER

BACKGROUND OF THE INVENTION

1. Field of the Invention

The field of the invention is electronic controllers for controlling a machine, an assembly line or a commercial process. More particularly, the invention relates to programming a system controller with instructions based on fuzzy logic in addition to instructions based on Boolean logic.

2. Description of the Background Art

Programmable controllers are employed in many industrial and commercial applications to control the operation of various machines and processes. They fall into the broad category of real-time sampled data systems. In a certain maximum time, inputs are read, controlling equations are applied, and outputs are actuated. These controllers have employed Boolean or binary logic in which individual bits are evaluated as being either "true" or "false". Arithmetic functions, such as addition, subtraction, and multiplication have also been provided, along with instructions to transfer data bytes between a controller processor and I/O modules or to transfer data bytes within the memory of the controller.

Programmable controllers have been adapted to certain process control applications using analog I/O interface modules to receive analog signals from pressure and temperature sensors and to transmit signals to control analog outputs. For example an analog input module might receive an input signal in a range from 0.0 volts to +10 volts or from +10.0 volts to −10 volts, this range being scaled to the maximum and minimum values for temperature or pressure.

In recent years, a mathematical theory known as "fuzzy logic" has been the subject of a series of articles and papers by Lofti A. Zadeh. See, for example, Zadeh, L., "Fuzzy Logic" *IEEE Computer*, April, 1988, pages 83–93.

Fuzzy logic is not imprecise as the expression might suggest. It is, in fact, a mathematical theory based on a combination of multivalued logic, probability theory and expert system theory and does incorporate an element of mathematical precision. However, fuzzy logic allows answers or outputs which we might called "shades of gray", neither true nor false, but somewhat true or somewhat false at the same time. These shades of gray are also known as degrees of truth or grades of membership.

An example of an expert system of the general type utilized in a fuzzy logic system is disclosed in Hardy et al., U.S. Pat. No. 4,648,044 issued Mar. 3, 1987. Other references in the field are provided in Sakurai et al., U.S. Pat. No. 5,012,430 and in Self, K., "Designing with Fuzzy Logic", IEEE Spectrum, November, 1990, pages 42–44 and 105.

SUMMARY OF THE INVENTION

The invention incorporates fuzzy logic instructions in a user program for downloading and execution in a programmable controller.

The invention is incorporated in a method of operating a programming computer to display a controller program based on fuzzy logic for downloading and execution in a programmable controller processor.

In response to a plurality of user inputs, a ladder diagram representing a programmable controller ladder program based on fuzzy logic is displayed on the screen of the programming computer. The program includes fuzzy logic program input instructions. The program also includes fuzzy logic program output instructions, and portions of rungs representing control rules for associating input instructions with each other and for associating input instructions with a related output instruction. The program also includes links between parallel rung branches representing rules for relating the contributions of the respective output membership functions in parallel rung branches to an individual result.

The program is translated from the programmable controller ladder program based on fuzzy logic into a set of instruction codes and into knowledge base data organized in a plurality of tables for access during execution of the instruction codes in the programmable controller.

The invention is further practiced when the ladder program is downloaded for execution into a programmable controller processor, and when the program is actually executed, but these steps are not necessary to the broadest aspects of the invention.

Several examples shall be described for translating the program. One example involves translation of the fuzzy logic program into tables for installation in the data table of the programmable controller memory and generation of a loop program for executing the fuzzy logic functions which are embedded in the tabular data. The data tables and loop program may in some instances be generated by more than one peripheral programming device. The translation may also take the form of translation to macrocodes of the type known in programmable controllers. These macrocodes are executed by reference to routines of microprocessor-level instructions stored in a memory in the programmable controller.

Other objects and advantages, besides those discussed above, shall be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

DETAILED DESCRIPTION OF THE PREFERRED EMBODIMENTS

Figure 1:
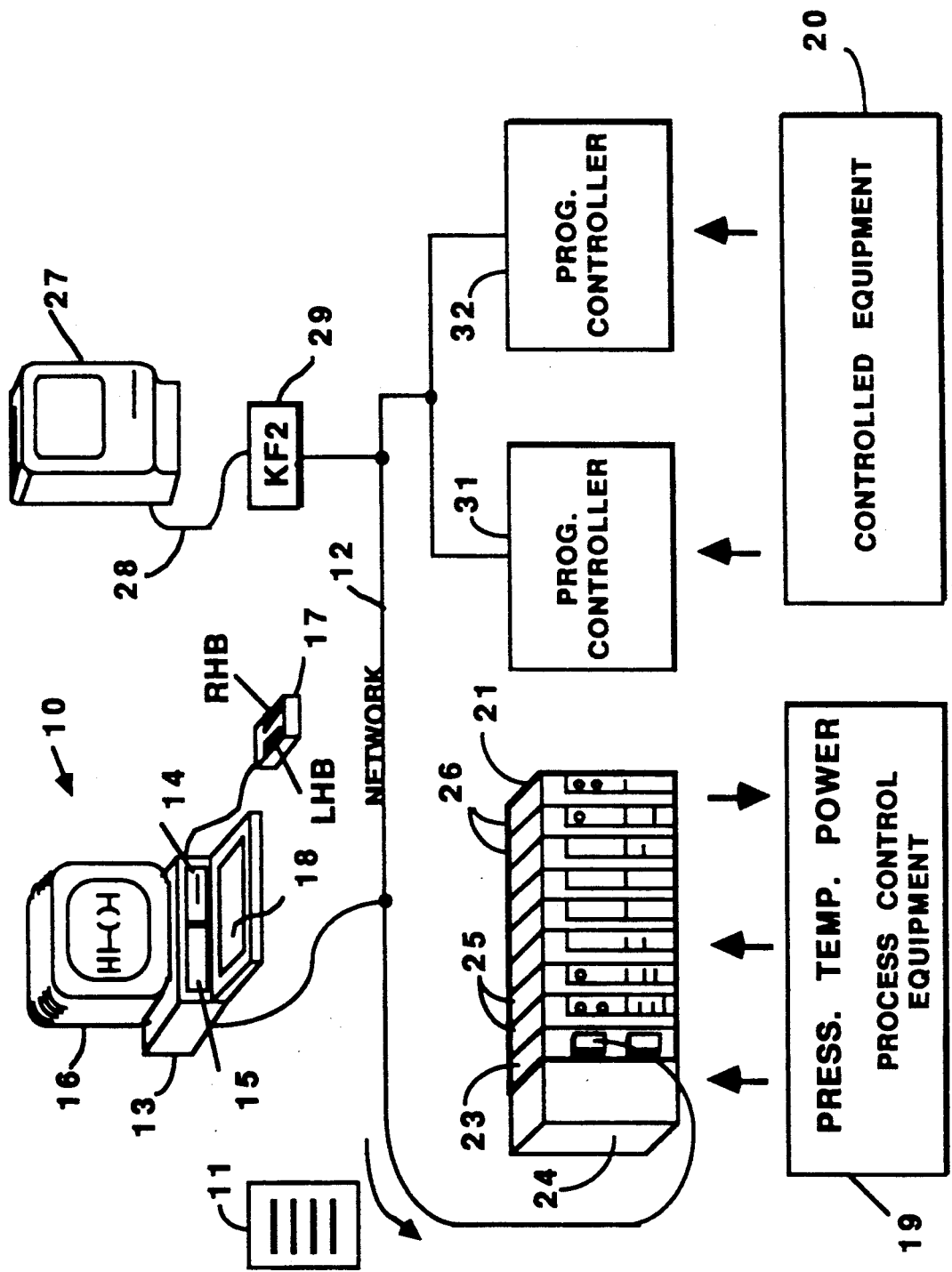
FIG. 1 is a diagram of a programmable controller and programming terminal for practicing the method of the present invention.

The invention is practiced on a programming computer 10 for programming an electronic controller in one of several high-level programming languages. The program may then be downloaded to a programmable controller processor 23 in a program file 11.

The programming computer 10 includes, for example, a Compaq 286 or Compaq 386 desktop computer 13 with one floppy disk drive 14, and a hard disk 15 of twenty or more megabytes capacity. The computer 13 is loaded with the MS-DOS operating system, and the PLC-5 Programming Software (6200 Series) from Allen-Bradley Company, Inc. A graphics monitor 16 is equipped with a suitable graphics controller and is connected to the computer 13 to provide for visual output to the user. The user input devices for the personal computer 10 include a mouse 17 and a keyboard 18. The mouse 17 has two buttons, a right hand button (RHB) and a left hand button (LHB).

A modular programmable controller includes a processor chassis 21 which holds a modular system processor module 23 in its left-most slot. The processor chassis 21 also has a power supply 24 attached to one side and a group of I/O modules 25, 26 in other slots. The programming computer 10 is connected to this module 23 through a network 12 such as Data Highway or Data Highway Plus, available from Allen-Bradley Company, Inc.

The general functions of the controller processor module 23 and the I/O modules 25, 26 are well known to those of ordinary skill in the art. The controller processor module 23 executes a control program, sometimes also referred to as a user's application program, the program is developed in a user program language for one of many possible industrial applications. In executing the program, the controller processor module 23 generates output status data in response to the state of input status data and according to the logic contained in the user control program.

At some predetermined interval, the controller processor module 23 executes an I/O scan in which input status data is read from those of the I/O modules 25, 26 that are input modules, and output status data is written to those of the I/O modules 25, 26 that are output modules.

The I/O modules 25, 26 that are digital input modules convert AC and DC signals from input devices to digital signals that can be stored as input data. The I/O modules 25, 26 that are digital output modules convert digital output data to AC and DC signals for operating output devices. The I/O modules 25, 26 connect to these input and output devices through swing-arm connectors with screw-type terminals of a type well known in the art.

In this example, a first group of process control equipment 19 includes transducers for sensing temperature and pressure and sending analog signals to analog input modules 25 included in the controller 21 The process control equipment 19 also includes a power output device which receives an analog output signal from an analog output module 26 in the controller chassis 21.

A control program or user's application program for the controller processor 23 is entered on the programming computer 10 as a high-level graphical diagram, using the graphical programming software, such as the 6200 Series, which runs on the programming computer 10. The controller program file 11 may then be compiled into executable code, and is then transferred to the controller system processor 23.

In addition to the first programmable controller comprising the electronic controller equipment in chassis 21, two other programmable controllers 31 and 32 are illustrated in FIG. 1. These controllers 31 and 32 also have controller processors connected to the network 12 to receive program files downloaded from the programming computer 10.

In addition to the first programming terminal, a second programming terminal in the form of an Apple Macintosh Classic personal computer 27 with 4 Megabytes of RAM and at least a 20 Megabyte internal hard disk is also connected via an RS-232-C data communication link 28 through an Allen-Bradley KF-2 network interface module 29 and network 12 to the programmable controller processor 23. The Macintosh Classic is running a software program known as InControl Version 1.4 developed and available for license from Rockwell International. This is a program for generating a fuzzy logic program file based on textual program statements and graphically defined membership functions. For further information about InControl, Version 1.4, reference is made to the User's Manual for this software.

Figure 2:
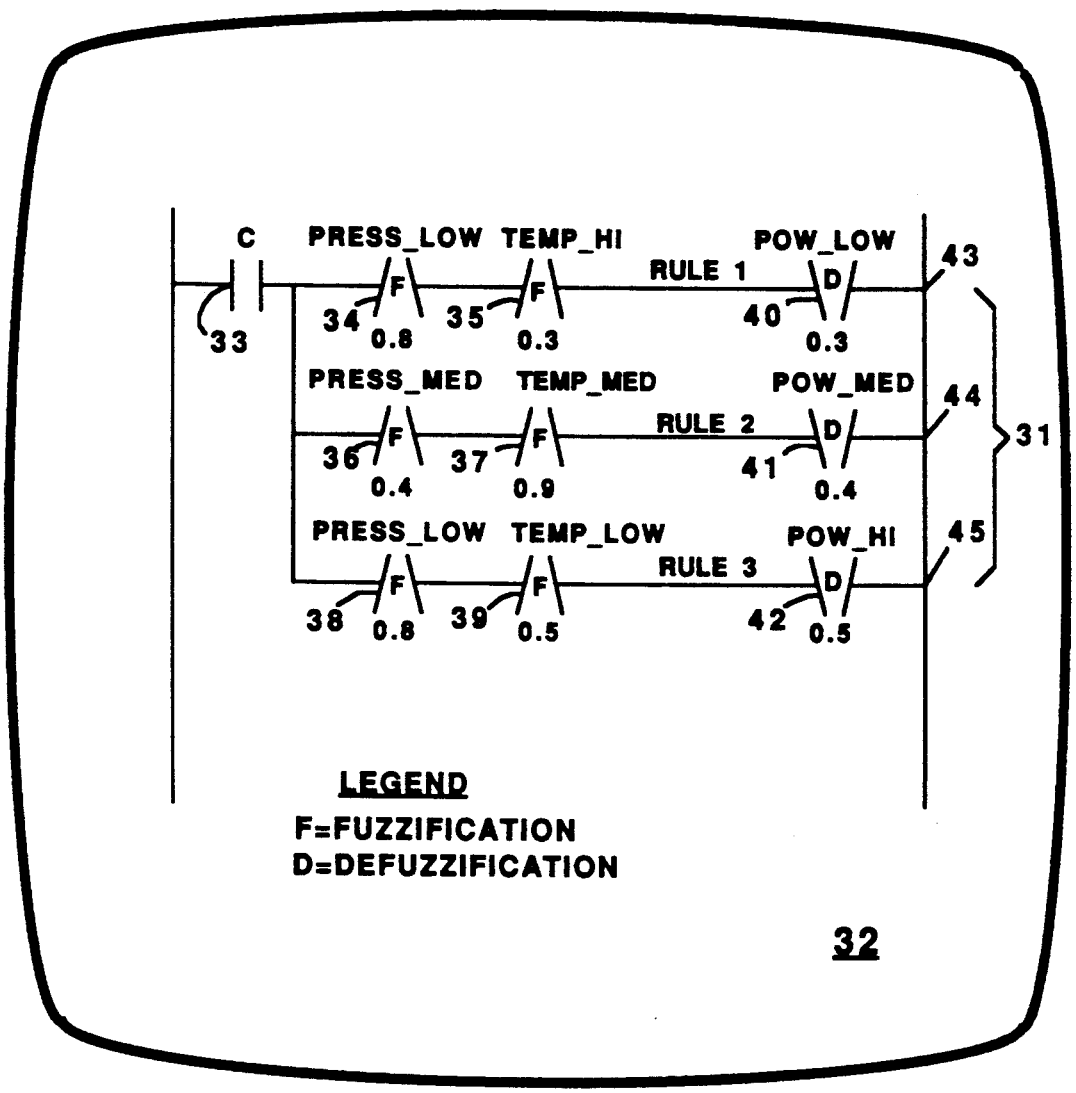
FIG. 2 is an enlarged view of a screen display on the programming terminal of FIG. 1.

FIG. 2 shows one rung 31 of a ladder diagram program for a programmable controller as displayed on the screen 32 of the programming terminal 10. The contact 33 labeled "C" is only shown for reference as a graphic help to emphasize that the rules drive a common output, which in this example is power. If contact 33 is open then the rung is not executed and the output is undefined. The fuzzy controller uses the two inputs pressure (PRESS) and temperature (TEMP), and computes a composite power (POW) output.

FIG. 2 shows a number of fuzzification or input instructions 34, 35, 36, 37, 38 and 39 denoted by the letter "F" and the symbol "/ \", which are each in their own right a symbol of the fuzzification step. Above each input instruction 34–39 is the name of a variable, such as temperature (TEMP) or pressure (PRESS), and its membership function (LOW, MED, HI). The value below each input instruction 34–39 is the current degree of membership for pressure or temperature, as applicable, which has resulted from mapping input data into the designated input membership function. For example, the current value of pressure mapped into the LOW membership function produces a grade of membership of 0.8. For current values to be displayed, the programming terminal 10 receives current values of input data from the programmable controller processor 23 via network messages. The grade of membership for the input membership function is normalized from 0.0 to 1.0 along a y-axis in an x-y coordinate system. The range of a variable is also normalized along the x-axis in a range from −1.0 to 1.0 where the minus sign signifies left of center. This will be illustrated in the membership function diagrams to be discussed below.

FIG. 2 also shows a number of output instructions 40, 41 and 42 denoted by the letter "D" and the symbol " \ /", which are each in their own right a symbol of the defuzzification step. Above each output instruction 40-42 is the name of a variable, in this example, power (POW) and its membership function (LOW, MED, HI). The value below each output instruction 40-42 is the current value of the output, mapped into the designated input membership function (LOW, MED, HI). For example, the current value of power mapped into the LOW membership function produces a degree of membership of 0.3. Output variables are also normalized in a range from −1.0 to +1.0.

The rung 31 in FIG. 2 includes three branches 43, 44, and 45. Each branch 43, 44, and 45 of the rung 31 represents a control rule, and the control rules in this instance can be stated in text statements as follows:

Rule 1: If pressure is low (PRESS_LOW) and temperature is high (TEMP_HI) then power is low (POW_LOW);

Rule 2: If pressure is medium (PRESS_MED) and temperature is medium (TEMP_MED) then power is medium (POW_MED); and Rule 3: If pressure is low (PRESS_LOW) and temperature is low (TEMP_LOW) then power is high (POW_HI).

Note that Rule 1, Rule 2 and Rule 3 relate to the same output variable, which is power. Each of the three rules or branches 43-45 contributes a weight to the final result for output power, and whichever rule has the greatest "weight" will influence the result (power) towards its side. In a logical sense this is applying a type of "OR" function to the three rules. To evaluate the contribution of the three rules to the result is the process of "defuzzification."

Within each rule or branch 43, 44 and 45, the connection of two fuzzy input instructions is determined by an "inference" rule which in this instance, is expressed as a fuzzy logic "AND" function. This inference rule thereby specifies a "MINIMUM" function which compares the absolute values of two input instructions and yields the smaller of two values (e.g. "0.3 AND 0.8" equals 0.3).

For purposes of showing how input membership functions are evaluated and the rules operate, assume, for example, that the actual value of pressure is somewhere in the low range and the actual value of temperature is somewhere in the medium range.

Applying Rule 1, we find that if pressure is low and temperature is medium, instruction 34 produces a high degree of truth (pressure is low), whereas instruction 35 has a low degree of truth Rule 1 will contribute to the result by a factor of 0.3, since the temperature is not high. Applying Rule 2 produces a lower degree of truth for instruction 36 (pressure is medium) and a higher degree of truth for instruction 36 (temperature is medium). Rule 2 will contribute to the final power result by a factor of 0.4. Applying Rule 3 produces a high degree of truth for instruction 37 (pressure is low) and a a moderate degree of truth for instruction 36 (temperature is low, when in fact it is medium). Rule 3 will contribute to the final power result by a factor of 0.5.

The three rules throw their "weight" into the resulting output power, which is indeed a compromise of all of them. By inspecting the right sides (magnitudes of all OUTPUT POWER functions) it is intuitively realized that the resulting output, power, is between medium and high.

As the measured variables pressure and temperature change so does the "weight" of each rule and the common output, power.

Figure 3:
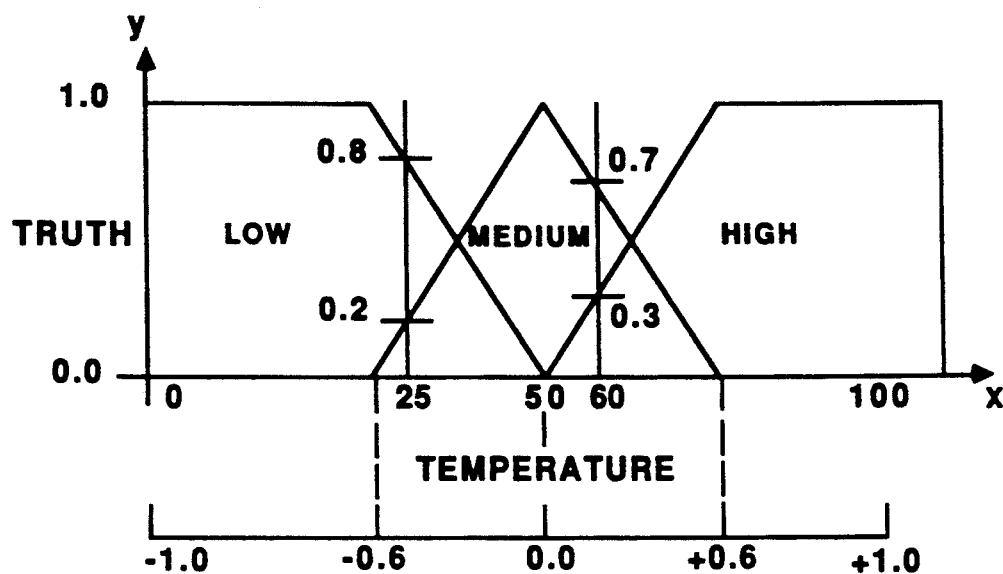
FIG. 3 is a graph of temperature vs. degree of truth for a set of three fuzzy logic membership functions.

The evaluation of input and output membership functions is graphically illustrated in FIG. 3. Temperature has a range of e.g. 0° F. to 100° F. which is normalized from −1.0 to +1.0 along the x-axis. A temperature of 50° F. would be at 0.0 along the x-axis. The MEDIUM temperature function can be described by the four x-y coordinates (−0.6, 0.0), (0.0, 1.0) (0.0, 1.0) and (+0.6, 0.0). The LOW temperature function can be described by the four coordinates (−1.0, 1.0), (−0.6, 1.0) (−0.6, 1.0) and (0.0, 0.0). The HIGH temperature function can be described by the four coordinates (0.0, 0.0) (+0.6, 1.0), (+0.6, 1.0) and (+1.0, 1.0).

In FIG. 3, a temperature of 25 degrees is a member of "LOW" input membership function at 0.8 but is also a member of "MEDIUM" input membership function at 0.2.

Similarly, a temperature of 60 degrees is a member of "MEDIUM" input membership function at 0.7 and a member of "HIGH" input membership function at 0.3.

Figure 4:
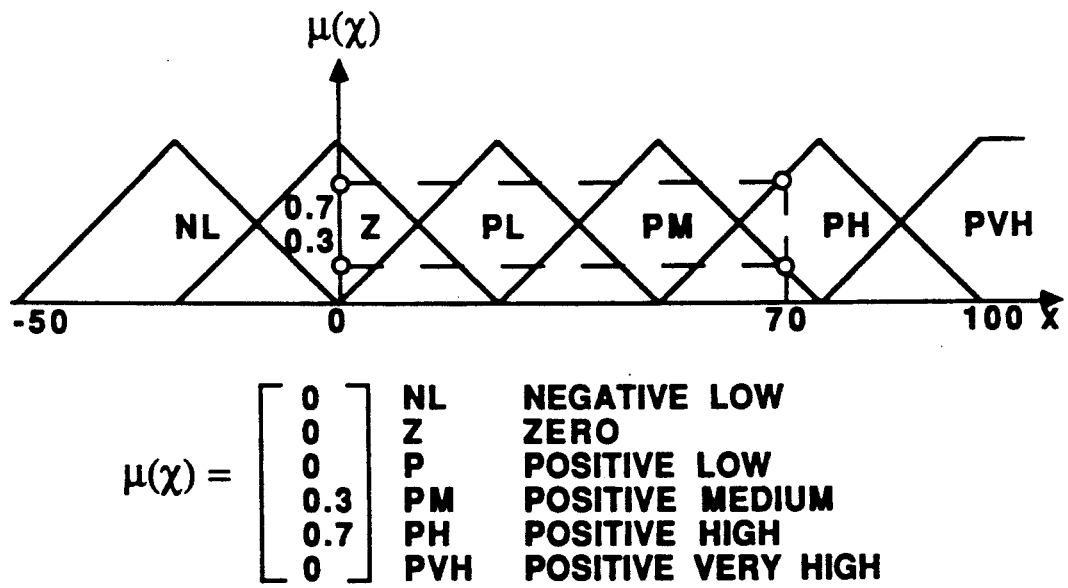
FIG. 4 is a graph of a variable (x) as a function of a set of membership functions.

The range of a variable and the domain of the membership functions may be visualized by the set of memberships in form of a matrix. The translation of a variable to a value within its membership is called fuzzification. The slopes and boundaries of these sets must be defined in some way in the controller to implement the fuzzy logic instructions. FIG. 4 shows a second example of the fuzzification of a variable (x). In a range from −50 to 100, the variable may belong to any of six input membership functions. At 70 the variable is a member of the POSITIVE MEDIUM membership function at 0.3 and the POSITIVE HIGH membership function at 0.7. It is not a member of the other membership functions, as shown by the matrix of values given for $\mu(x)$.

Figure 6:
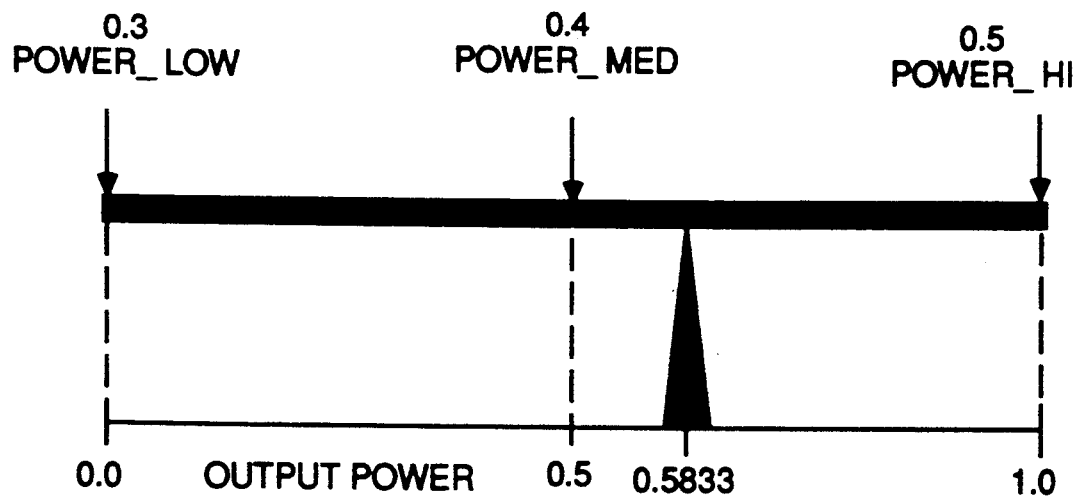
FIG. 6 is a diagram of a defuzzification method applied to outputs shown in FIG. 2.

The function for achieving the defuzzification of the three power outputs in FIG. 2 is illustrated graphically in FIG. 6. In this case, the defuzzification function is evaluated as a weighted average illustrated in the form of a balance beam. This defuzzification rule has several corollaries as follows:

1) The relative weight, not the absolute weight, controls the output, e.g. making LOW=0.15, MED.=0.2, and HI=0.25 yields the same support point.
2) At least two weights must be placed at different locations to be balanced, at least one of them must be less than 1.0 (not saturated).
3) If only one weight is present the support point is directly under it no matter how heavy the weight is (dead band).
4) If no weight is present the output is undefined. (If no branch of the rung 31 executes, the output is not zero but is undefined).

With the three results of 0.3, 0.4 and 0.5 shown in FIG. 2 for power, average of evaluating the inputs produces a result between the result of the middle branch (POW_MED=0.4) and the result of the lower branch (POW_HI=0.5). It is precisely 0.5833 from the left hand corner.

Figure 5:
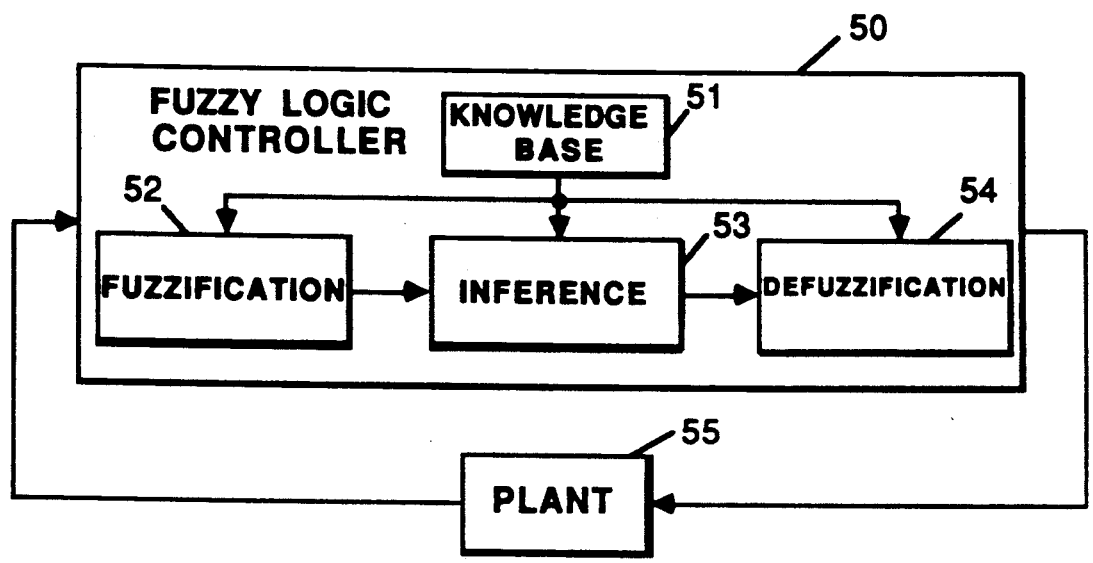
FIG. 5 is a generalized block diagram of a fuzzy logic controller.

FIG. 5 is a block diagram of a fuzzy logic controller 50. The knowledge base represented by block 51 contains for the variables, such as PRESSURE and TEMPERATURE, scale factors and proposition statements (similar to text statements for Rules 1, 2 and 3) which name the variables (PRESS, TEMP) and membership functions (HIGH, MEDIUM, LOW) and state the control rules to relate the variables and membership functions. Thus, it is seen that the ladder diagram in FIG. 2 constitutes a knowledge base 51.

The controller 50 takes the information from the knowledge base 51 and performs fuzzification, represented by block 52 to map the values as determined by the membership function. The Inference represented by block 53 is the evaluation of multiple inputs according to the fuzzy "AND" function, as discussed above, and other such rules of inference, here described as the "Minimum". The Defuzzification, represented by block 54 is the mechanism of drawing a conclusion from the various control rules concerning the same output variable, in this case by putting the different contributions at their assigned places as weights on a balance beam and finding the support point for equilibrium. In FIG. 5 the block 55 labeled "plant" represents the controlled equipment in FIG. 1.

It should be remembered that the variables such as TEMPERATURE and PRESSURE would be sensed by the programmable controller 23 as analog inputs. As such, power would be expressed over its range as a signal from 0.0 volts to 10.0 volts, which would then be divided for several membership functions normalized between $-1.0$ and $+1.0$. Likewise, pressure might range from 40 to 250 psi and be expressed as a signal from 0.0 Volts to 10.0 Volts, which would then be divided for several membership functions normalized between $-1.0$ and $+1.0$. And lastly, temperature might range from 0° F. to 100° F. which would then be divided for several membership functions normalized between $-1.0$ and $+1.0$.

Figure 7:
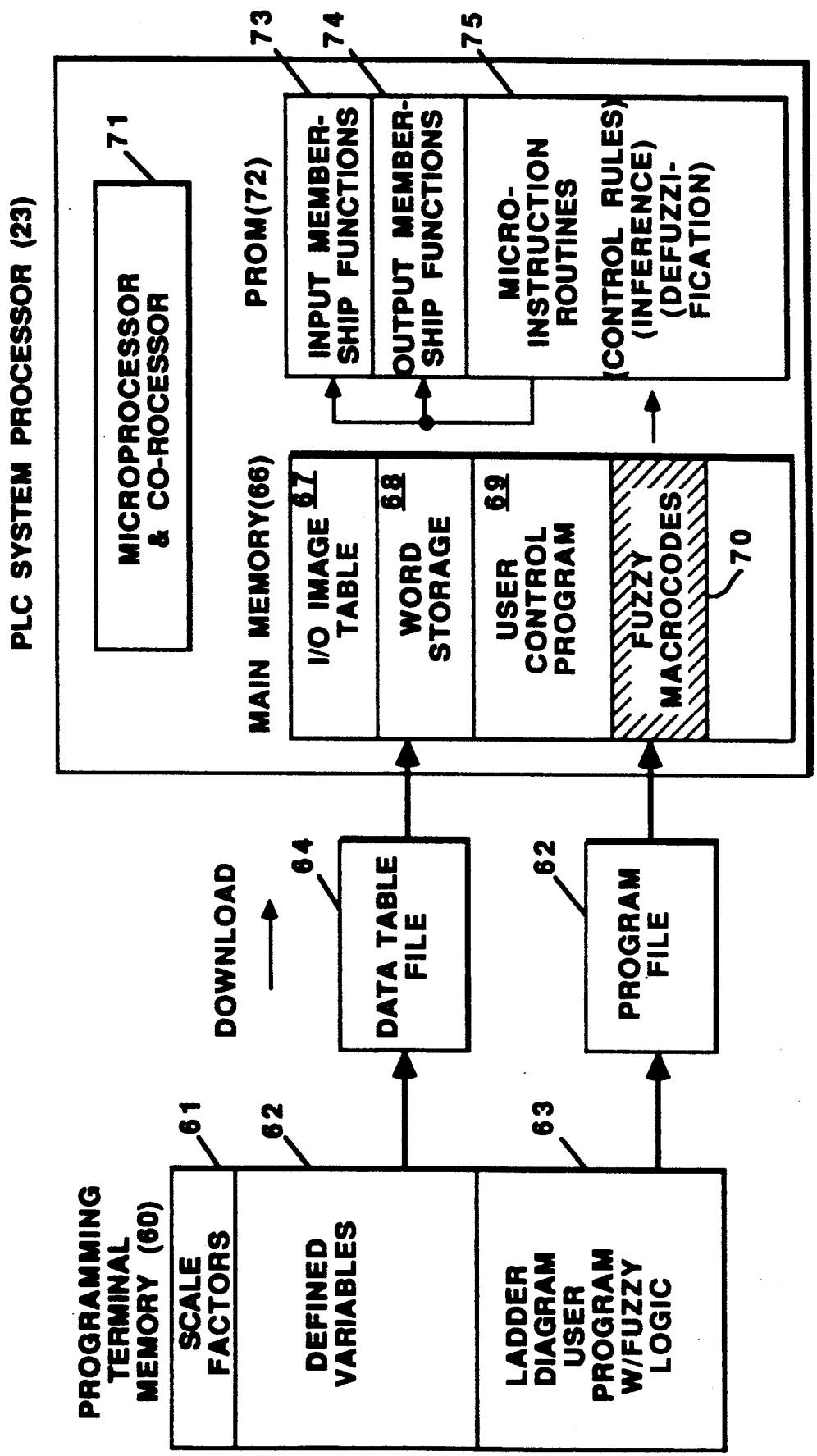
FIG. 7 is a block diagram showing one method of downloading and executing a fuzzy logic program of FIG. 2 in the programmable controller of FIG. 1.

Referring next to FIG. 7, a first manner of programming, downloading and executing the fuzzy logic program of FIG. 2 shall be described. Certain scale factors 61 for variables are defined and stored in memory 60 when the programming terminal 10 is operated using the PLC-5 Programming Software (6200 Series). Scale factors can also be entered by using block transfer ladder instructions of a type known in the art, when analog input modules are used. Thus, the range for pressure and temperature would be entered and related to the range of analog I/O signals as discussed above.

Typically, live data for input and output variables is stored at memory locations in the PLC main memory 66 in FIG. 7. If alphanumeric tags or symbols, such as TEMP and PRESS, are desired for use in programming, these would be related to physical memory locations during entry of the ladder program to link the word storage areas with the I/O modules. The configuration of the I/O image table 67 and word storage area 68 is handled by downloading a data table file 64 from programming terminal memory 60.

The ladder diagram program 63, including the fuzzy logic rung 31, is entered using keys on keyboard 18 of the programming terminal 10, with additional commands or even additional keys being available to enter the fuzzy logic instructions described above. The complete ladder program 63 would be developed by adding rungs until all of the desired controller functions are entered. Also, additional rungs would be entered for the block transfer communication instructions to link areas in memory 66 with the I/O modules 25, 26. For further explanation of programming operations, reference is made to the Manuals for the PLC-5 Programming Software (6200 Series) available from Allen-Bradley Company, Inc., Highland Heights, Ohio.

The program 63 is saved as a program file for downloading to a PLC system processor 23. Such a program may or may not be translated or compiled before downloading, as explained in more detail below. As used herein, the term "translated program" may be used to describe a compiled program and may also be used to describe an interpreted program. In compilation, a user-originated program of higher-level instructions is converted to a file of native instructions, usually microprocessor-level instructions, for execution by a specific microprocessor. In interpretation, the higher-level instructions in such a user-originated program are not converted beforehand but are converted during run time, one-by-one, to microprocessor-level instructions as the program is being executed by a PLC system processor.

Many programmable controllers, particularly many of those offered by the assignee of the present invention, use an interpreted method of executing ladder diagram instructions. The ladder instructions seen on the screen, both Boolean instructions and fuzzy logic instructions, are translated into an operation code and an operand, the operand usually relating to a location in the I/O image table 67 or word storage area 68. The operation codes, referred to herein as macrocodes 70, and the operands are downloaded to the PLC system processor 23 and specifically to a random access memory (RAM) known as the main memory 66. These macrocodes are executed in sequence during a program scan of the user control program. As each macrocode 70 is accessed, the microprocessor 71 uses the macrocode 70 to form an address in PROM memory 72, where a routine of microinstructions 75 in a microprocessor-level instruction language resides. The microprocessor jumps over to that address in PROM 72 and begins executing the microinstructions 75 to carry out the function dictated by the macrocode 70. This interpretive method is described in several patents including Schultz, U.S. Pat. No. 4,443,865, issued Apr. 17, 1984, for a "Processor Module for a Programmable Controller".

The fuzzy logic programming interface of FIG. 2 could be used with a traditional interpretive type of execution provided that existing equipment is retrofitted with a PROM 72 having routines of microinstructions for carrying out the fuzzy logic functions. The fuzzy logic instructions in FIG. 2 can be used to generate macrocodes 70 to carry out fuzzy logic functions, including control rules, inference and defuzzification. In addition, predefined membership functions can be stored as tables 73, 74 either in PROM 72 or in RAM 66. These membership functions 73,74 are then referenced by using appropriate labels in the user program 63, which are used to form addresses for accessing information in the PROM 72 or RAM 66. Due to the mathematical nature of evaluation of the membership functions, the control rules, inference and defuzzification, it is preferred that a co-processor be used with the microprocessor 71 to execute the control program.

Figure 8:
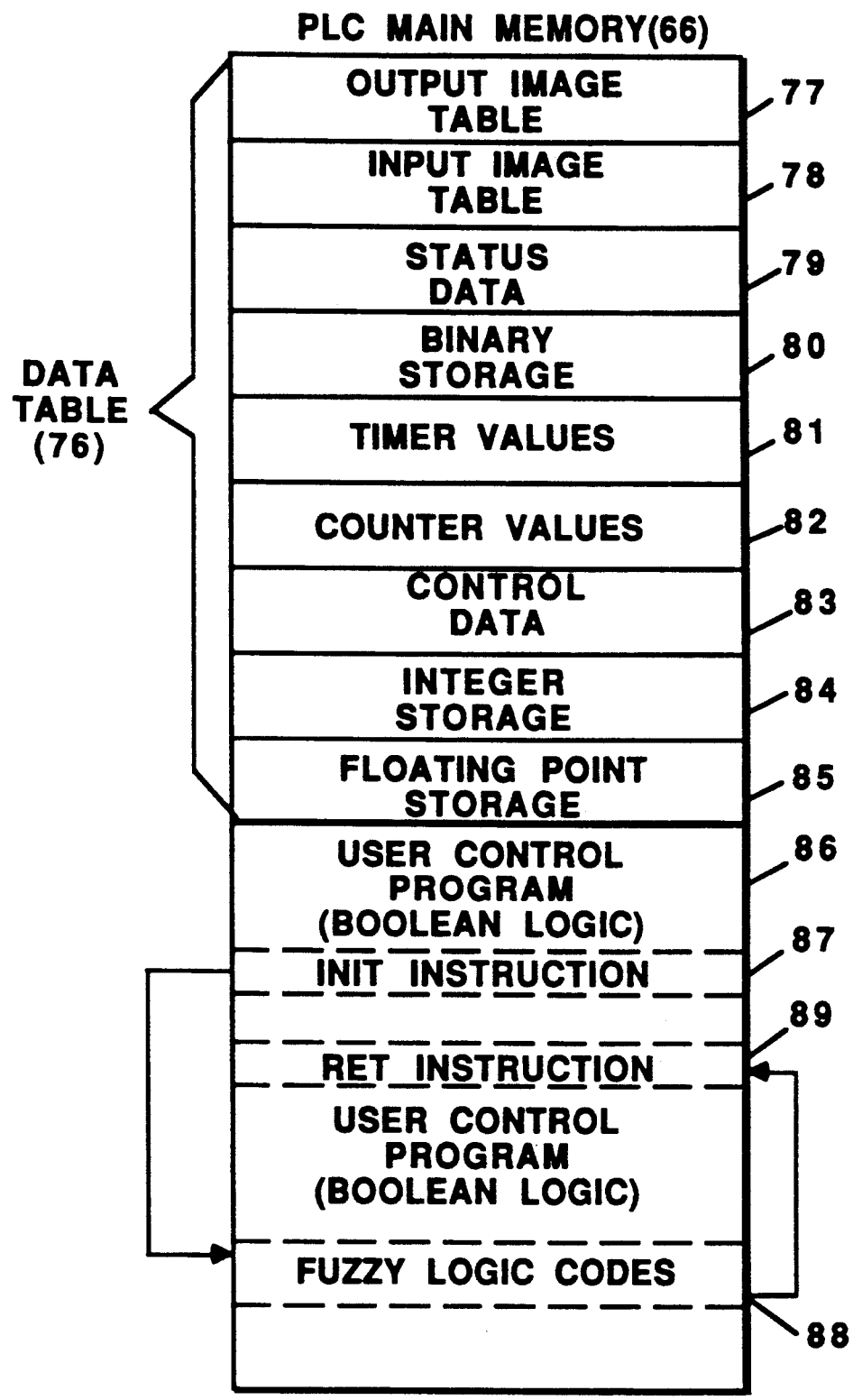
FIG. 8 is a memory map of the PLC main memory of FIG. 7 showing an alternate method for program execution.

FIG. 8 shows a second method of executing the fuzzy logic program rung seen in FIG. 2 as part of a larger user application program with Boolean rungs and rungs for I/O communication.

As seen in FIG. 8, a data table 76 in the main memory 66 is more particularly subdivided into areas for output image table 77, input image table 78, storage for status data 79, an area for binary data 80, an area for timer values 81, an area for counter values 82, an area for control data 83, an area for integer data 84, and an area for floating paint data 85. This is one example of a data table 76 and other organizations can be used so long as areas for bit-oriented and word-oriented I/O data are provided. Data relating to membership functions can be stored in one or more of these areas of the data table 76, if desired.

In the method of FIG. 8, the fuzzy logic instructions (fuzzy logic codes) are compiled directly into microprocessor-executable instructions 88 and are downloaded and stored in an area reserved for storage of the user control program 86. The user control program 86 contains an initiation instruction 87, which when encountered will cause a jump to execute the fuzzy logic codes 88. Upon completion of execution of the fuzzy logic codes 88, a return is executed to the next macroinstruction 89, and the user program continues executing in sequence to other instructions including Boolean instructions. This method of executing two distinct portions of a user application program adopts the method disclosed in Struger et al., U.S. Pat. No. 4,302,820, Nov. 24, 1981, entitled "Dual Language Programmable Controller."

Figure 9:
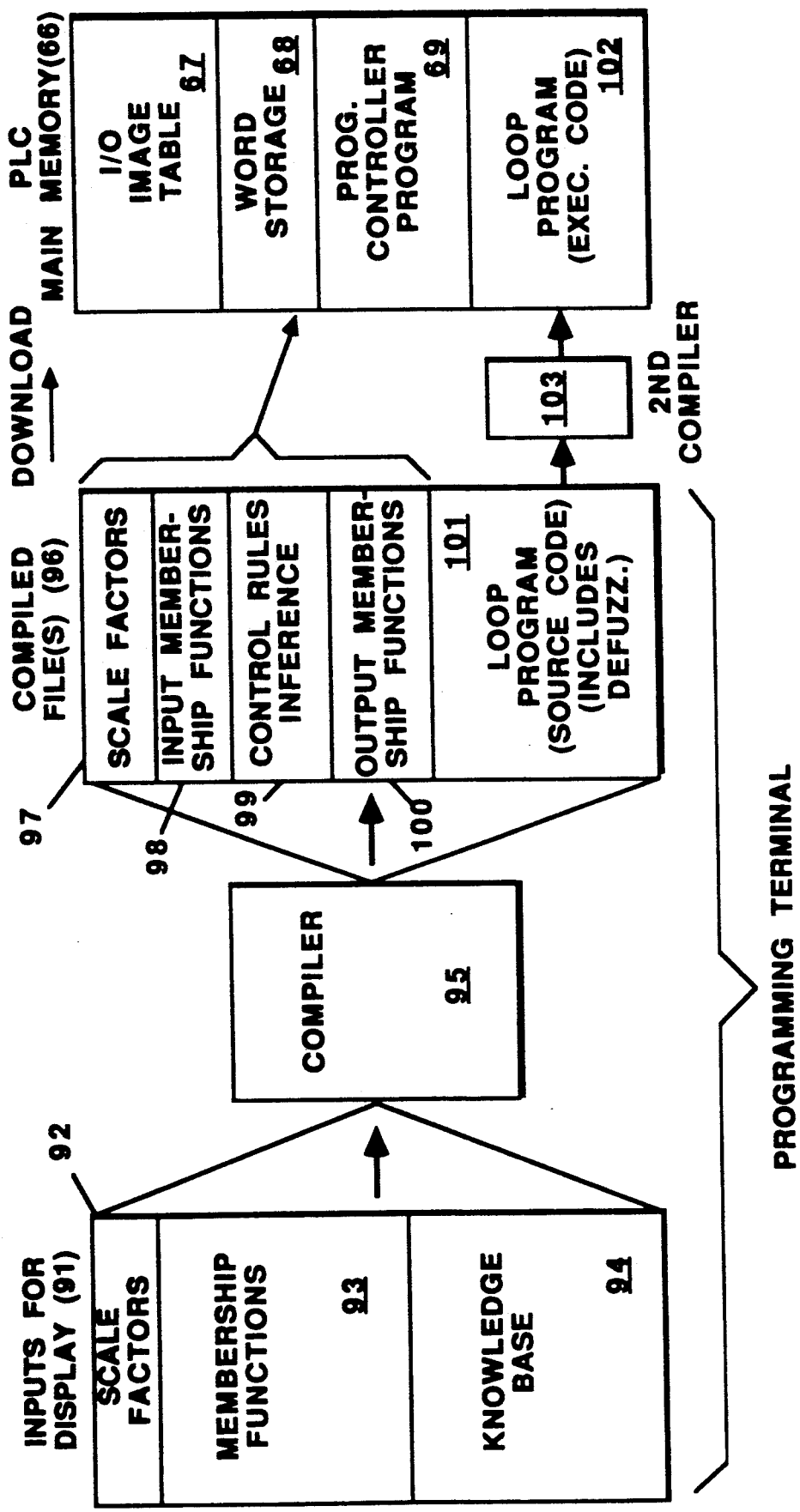
FIG. 9 is a block diagram showing additional methods of downloading and executing fuzzy logic instructions in the programmable controller of FIG. 1.

FIG. 9 shows a third method of user programming, downloading and then executing a user application program with fuzzy logic instructions. This third method involves two versions, one with text-type program statements and a second version with ladder-diagram type programming.

As discussed above, an Apple Macintosh Classic running the InControl Version 1.4 software may be connected via the network 12 to the PLC system processor 23.

Table 1 below shows an example of a fuzzy logic program provided by InControl with text-type statements. In this program, represented by elements 92-94 in FIG. 9, a tank is filled to a level by operating two water valves, one for hot water and one for cold. The tank is to be filled according to a certain temperature profile.

TABLE 1

Fuzzy Logic Program

Comment: "This program keeps a water tank at about medium level and at a lukewarm temperature, pleasant to take a shower. As water is used, two supply pipes (hot and cold) of unknown temperatures refill the tank using the tank level and tank temperature as inputs (sensor), the fuzzy controllers adjust the hot and cold intake (control outputs)."
"Water Tank Rules"
"The sensors (inputs) are waterlevel and temperature"
input level 0 16 temp 32 212;
"The control outputs are flow of hot water and flow of cold water into the tank"
output fhot 0 40 fcold 0 30;
if level is zero then fhot is open and fcold is open;
if level is low then fhot is open and fcold is open;
if level is medium and temp is freezing then fhot is n.closed and fcold is closed;
if level is medium and temp is cold then fhot is n.closed and fcold is closed;
if level is medium and temp is warm then fhot is closed and fcold is closed;
if level is medium and temp is hot then fhot is closed and fcold is n.open;
if level is high then fhot is closed and fcold is closed.

The range of the tank level is from 0 to 16 feet. The range for the temperature variable is from 32° F. to 212° F. The range for the hot water valve flow is from 0 to 40 gallons per minute. The range for the cold water valve flow is from 0 to 40 gallons per minute. These can be scaled as represented by area 92 in FIG. 9.

The modifiers, "zero, low, medium and high" are input membership functions for the variable "level". The modifiers "freezing, cold, warm and hot" are input membership functions for the variable "temp". The modifiers "closed, n.closed and open" are output membership functions for the variables "fhot" (flow of hot water) and "fcold"(flow of cold water). These can be defined in InControl as represented by area 93 in FIG. 9.

The statements or propositions in Table 1 above are represented by knowledge base 94 in FIG. 9

Appendix A contains an example of a program in the C source language which has been compiled from the source file 91 in Table 1 above, using a compiler (95 in FIG. 9) associated with the InControl software. The initial comment paragraph in Appendix A contains a definition of the variables, "level", "temp", "fhot" and "fcold". Line 11 shows the scaling of the input variables and line 12 shows the scaling of the output variables (together represented by reference 97 in FIG. 9). This is followed by a table (lines 13-22) defining nine input membership functions (represented by reference 98 in FIG. 9), a table of the control rules (lines 23-30) (represented by reference 99 in FIG. 9) extracted from the proposition statements in Table 1 above and a table of output membership functions (lines 31-38). For each membership function (lines 14-22, Appendix A), the function type is given, followed by four values which are x-coordinate values, where the y-coordinate to the first and fourth values is 0.0 and the y-coordinate to the second and third values is 1.0. This is followed by the membership ID number and label For example, input membership function "Nr. 1" is a "type 2" function labeled "cold" and defined by values $-0.9$, $-0.55$, $-0.55$ and $-0.2$. These values describe a triangle with its apex at $-0.55$ and its lower corner vertices at $-0.9$ and $-0.2$.

The tables are followed in Appendix A (line 39) by a loop program in the C source programming language, represented by reference 101 in FIG. 9. This file 101 operates on the data in the tables to execute the fuzzy logic program and also incorporates the defuzzification code. In Appendix A, the main portion of the loop routine is followed by a key subroutine "memgrade.c" which is called by the loop program to evaluate membership functions.

Using compiler program 103, the loop program is then compiled a second time from the C source language to a file 102 of microprocessor executable instructions and is downloaded as shown in FIG. 9 to the PLC main memory 66. The input membership data and output membership data and scale factors are transferred from the programming terminal to the word storage areas 68 in the main memory 66. An example of the tables for the program in Appendix A are given in Appendix B. In Appendix B, the "F" addresses signify areas for floating point storage 85 seen in FIG. 8, while the "N" addresses signify areas in the integer storage area 84. The compiled loop program 102 can then be executed using the method described with relation to FIG. 8 for compiled sections of a user control program. This requires downloading a ladder program into the PLC main memory with an instruction to access the compiled loop program which is downloaded from the Macintosh.

Alternatively, a loop program corresponding to that shown in Appendix A, can be written completely in ladder program source statements. This can be downloaded through network 12 from the programming terminal 10 rather than from the Macintosh 27. The tables and loop program can be developed and downloaded from either programming terminal 10,27, and a loop program in ladder diagram language can be stored as a library file in the programming terminal 10. Therefore, it is possible to use either programming terminal to download the fuzzy logic program.

In one possible division of labor, InControl is used to download the loop program and membership functions, while a programming terminal running 6200 Series programming software is used to download rule tables and scale factors. The rule table can therefore be based on a ladder diagram as shown in FIG. 2 as well as the text statements shown in Table 1 above.

Thus, methods have been described for programming of programmable controllers to execute programs based on fuzzy logic, particularly programs of the ladder diagram type. This will enhance the capabilities of programmable controllers, particularly in the area of process control.

This description has been by way of example of how the invention can be carried out. Those of ordinary skill in the art will recognize that various details may be modified in arriving at other detailed embodiments, and that many of these embodiments will come within the scope of the invention. Therefore to apprise the public of the scope of the invention and the embodiments covered by the invention the following claims are made.

Appendix A

```
/*
This file contains the fuzzy inference function tankcontrol(x,y), where
x is a 2 element input array and y is a 2 element output array.
The function normally returns 0, but will return 1 if no conclusion
can be obtained for one or more output.
The x and y vector elements are:
  x[0] = level, x[1] = temp
  y[0] = fhot, y[1] = fcold
*/
```

| | Nr. | Des. |
|---|---|---|
| static float inRange[4] = { 0, 16, 32, 212 }; | | |
| static float outRange[4] = { 0, 40, 0, 30 }; | | |
| static float anteFn[9][5] = { | | |
| 1, 0, 0, 0, 0, | 0 | Null |
| 2, -0.9, -0.55, -0.55, -0.2, | 1 | Cold |
| 3, -1, -1, -1, -0.8, | 2 | Freezing |
| 4, 0.75, 1, 1, 1, | 3 | High |
| 4, 0.6, 1, 1, 1, | 4 | Hot |
| 2, -1, -0.75, -0.75, -0.4, | 5 | Low |
| 2, -0.75, 0.25, 0.25, 1, | 6 | Medium |
| 2, -0.4, 0.2, 0.2, 0.8, | 7 | Warm |
| 3, -1, -1, -1, -0.75 }; | 8 | Zero |

| | Rule No. |
|---|---|
| static short ante[7][2] = { | |
| 8, 0, | 1 |
| 5, 0, | 2 |
| 6, 2, | 3 |
| 6, 1, | 4 |
| 6, 7, | 5 |
| 6, 4, | 6 |
| 3, 0 }; | 7 |

| | Output Function (y[0],y[1]) |
|---|---|
| static float conc[7][4] = { | |
| 0.25, 0.25, 0.25, 0.25, | Open, Open |
| 0.25, 0.25, 0.25, 0.25, | Open, Open |
| 0.15, -0.1275, 0.15, -0.15, | N. Closed, Closed |
| 0.15, -0.1275, 0.15, -0.15, | N. Closed, Closed |
| 0.15, -0.15, 0.15, -0.15, | Closed, Closed |
| 0.15, -0.15, 0.25, 0.1875, | Closed, N. Open |
| 0.15, -0.15, 0.15, -0.15 }; | Closed, Closed |

```c
int tankcontrol(x,y)
float *x, *y;
{
        float inPort[2], outBuf[4];
        float *rangePtr, *concPtr;
        float portVal, minVal, degFulfil, newGrade;
        int noConc;
        short *antePtr, i, j;
        extern float memgrade();

/* Clear the output buffer for accumulating conclusions. */
concPtr = outBuf;
i = 4;
while (i--) *concPtr++ = 0.0;

/* Scale the input to a number between -1 and +1. */
rangePtr = inRange;
for (i = 0; i < 2; i++) {
        minVal = *rangePtr++;
        portVal = (2.0 * (*x++ - minVal)/(*rangePtr++ - minVal)) - 1.0;
        if (portVal < -1.0) {
                portVal = -1.0;
        }
        else if (portVal > 1.0) {
                portVal = 1.0;
        }
        inPort[i] = portVal;
}

/* There are 7 rules. Process each rule. */
for (i = 0; i < 7; i++) {
        antePtr = ante[i];
        concPtr = conc[i];
        /* Deg. of fulfillment is the minimum of the antecedent membership grades. */ degFulfil = 1.0;
        for (j = 0; j < 2; j++) {
                newGrade = memgrade(inPort[j],anteFn[*antePtr++]);
                if (newGrade < degFulfil) degFulfil = newGrade;
                if (degFulfil == 0.0) break;
        }

/* Scale the rule's conclusion membership functions by the degree
           of fulfillment, and accumulate them in the output buffer. */
        if (degFulfil > 0.0) {
                for (j = 0; j < 4; j++) {
                        outBuf[j] = (*concPtr++ * degFulfil) + outBuf[j];
                }
        }
}

/* Compute the output value by dividing the
   accumulated centroid*area by the accumulated area. */
noConc = 0;
concPtr = outBuf;
rangePtr = outRange;
```

```
i = 2;
while (i--) {
        if (concPtr[0] > 0.0) {
                portVal = concPtr[1] / concPtr[0];
        }
        else {
                /* No conclusion was obtained, set output to 0. */
                portVal = 0.0;
                noConc = 1;
        }
        /* Scale the output. */
        portVal = (portVal + 1.0)/2.0;
        minVal = *rangePtr++;
        *y++ = (portVal * (*rangePtr++ - minVal)) + minVal;
        concPtr += 2;
} return noConc;
}
/*
File: memgrade.c

This file contains the function memgrade(x,fuzzyFn) for computing the membership
grade of x in the trapezoidal membership function fuzzyFn. The membership function
is represented by a float array of 5 elements: element 1 indicates the type of the
function (i.e., bounded, left side flush, right side flush, or valley shaped);
elements 2 through 5 give the coordinates of the corners of the trapezoid.
The membership grade is returned as a float number between 0 and 1.
*/ float memgrade(x,theFn)
float x, *theFn;
{
        int fnType;
        float leftBtm, leftTop, rightTop, rightBtm, grade;

fnType = (int) theFn[0];
        leftBtm = theFn[1];
        leftTop = theFn[2];
        rightTop = theFn[3];
        rightBtm = theFn[4];

switch (fnType) {
        case 1:
                /* the "any" function */
                grade = 1.0;
                break;
        case 2:
                /* bounded function */
                if (x < leftBtm || x > rightBtm) {
                        grade = 0.0;
                }
                else if (leftTop <= x && x <= rightTop) {
                        grade = 1.0;
```

```
        }
        else if (x < leftTop) {
                grade = (x - leftBtm)/(leftTop - leftBtm);
        }
        else {
                grade = (rightBtm - x)/(rightBtm - rightTop);
        }
        break;
case 3:
        /* left side flush function */
        if (x > rightBtm) {
                grade = 0.0;
        }
        else if (x <= rightTop) {
                grade = 1.0;
        }
        else {
                grade = (rightBtm - x)/(rightBtm - rightTop);
        }
        break;
case 4:
        /* right side flush function */
        if (x < leftBtm) {
                grade = 0.0;
        }
        else if (x >= leftTop) {
                grade = 1.0;
        }
        else {
                grade = (x - leftBtm)/(leftTop - leftBtm);
        }
        break;
case 5:
        /* valley shaped function */
        if (x <= leftTop || x >= rightTop) {
                grade = 1.0;
        }
        else if (x >= leftBtm && x <= rightBtm) {
                grade = 0.0;
        }
        else if (x < leftBtm) {
                grade = (leftBtm - x)/(leftBtm - leftTop);
        }
        else {
                grade = (x - rightBtm)/(rightTop - rightBtm);
        }
        break;
default:
        /* unknown function type */
        grade = 0.0;
        break;
} return grade;
}
```

Appendix B

Data Table  File  F:19          INPUT MEMBERSHIP FUNCTIONS decimal addresses     floating point data

| address | Mem.type | 1 | 2 | 3 | 4 | Func. No. |
|---|---|---|---|---|---|---|
| F19:0  | 1.000000 | 0.000000  | 0.000000  | 0.000000  | 0.000000  | 0 |
| F19:5  | 2.000000 | -0.900000 | -0.550000 | -0.550000 | -0.200000 | 1 |
| F19:10 | 3.000000 | -1.000000 | -1.000000 | -1.000000 | -0.900000 | 2 |
| F19:15 | 4.000000 | 0.750000  | 1.000000  | 1.000000  | 1.000000  | 3 |
| F19:20 | 4.000000 | 0.600000  | 1.000000  | 1.000000  | 1.000000  | 4 |
| F19:25 | 2.000000 | -1.000000 | -0.750000 | -0.750000 | -0.400000 | 5 |
| F19:30 | 2.000000 | -0.750000 | 0.250000  | 0.250000  | 1.000000  | 6 |
| F19:35 | 2.000000 | -0.400000 | 0.200000  | 0.200000  | 0.800000  | 7 |
| F19:40 | 3.000000 | -1.000000 | -1.000000 | -1.000000 | -0.750000 | 8 |
| F19:45 | 0.000000 |           |           |           |           |   |

Data Table  File  F:20          OUTPUT MEMBERSHIP FUNCTIONS decimal addresses     floating point data

| address | 0 | 1 | 2 | 3 | 4 |
|---|---|---|---|---|---|
| F20:0  | 0.250000  | 0.250000  | 0.250000  | 0.250000  | 0.250000  |
| F20:5  | 0.250000  | 0.250000  | 0.250000  | 0.150000  | -0.127500 |
| F20:10 | 0.150000  | -0.150000 | 0.150000  | -0.127500 | 0.150000  |
| F20:15 | -0.150000 | 0.150000  | -0.150000 | 0.150000  | -0.150000 |
| F20:20 | 0.150000  | -0.150000 | 0.250000  | 0.187500  | 0.150000  |
| F20:25 | -0.150000 | 0.150000  | -0.150000 | 0.000000  |           |

Data Table  File  N:21          CONTROL RULES decimal addresses     decimal data

| address | 0 | 1 | 2 | 3 | 4 | 5 | 6 | 7 | 8 | 9 |
|---|---|---|---|---|---|---|---|---|---|---|
| N21:0  | 8 | 0 | 5 | 0 | 6 | 2 | 6 | 1 | 6 | 7 |
| N21:10 | 6 | 4 | 3 | 0 | 0 | 0 |   |   |   |   |

Data Table  File  F:17          SCALE FACTORS decimal addresses     floating point data

| address | 0 | 1 | 2 | 3 | 4 |
|---|---|---|---|---|---|
| F17:0 | 0.000000 | 9999.000000 | 0.000000  | 9999.000000 | 0.000000 |
| F17:5 | 0.000000 | 16.000000   | 40.000000 | 180.000000  |          |

Data Table  File  F:18          SCALE FACTORS decimal addresses     floating point data

| address | 0 | 1 | 2 | 3 | 4 |
|---|---|---|---|---|---|
| F18:0 | 0.000000 | 9999.000000 | 0.000000 | 9999.000000 | 0.000000 |
| F18:5 | 0.000000 | 40.000000   | 0.000000 | 30.000000   |          |

We claim:

1. A method of operating a programming computer to display a controller program based on fuzzy logic for downloading and execution in a programmable controller processor, the method comprising:

in response to a plurality of user inputs, displaying on the screen of the programming computer a ladder diagram representing a programmable controller ladder program based on fuzzy logic, wherein the displaying step further comprises a) displaying fuzzy logic program input instructions with an input variable related to data in a programmable controller data table, an input membership function and an actual value representing evaluation of the input data with respect to a respective input membership function;

b) displaying fuzzy logic program output instructions with an output variable related to data in a programmable controller data table, an output membership function and an actual value representing a contribution of a respective output membership function to a resulting output;

c) displaying portions of rungs representing control rules for associating input instructions with each other and for associating input instructions with a related output instruction; and d) displaying links between parallel rung branches representing a rule for relating the contributions of the respective output membership functions in parallel rung branches to an individual result; and translating the displayed ladder diagram based on fuzzy logic into first and second portions, the first portion comprising a set of instruction codes to be executed by the programmable controller and the second portion comprising knowledge base data organized in a plurality of tables for access during execution of the instruction codes in the programmable controller.

2. The method of claim 1, further comprising the step of storing microprocessor-level instructions in programmable controller including:

a) a plurality of instructions for executing input and output membership functions;

b) a plurality of inference instructions for applying control rules for associating input instructions with each other and for associating input instructions with a related output instruction; and c) a plurality of defuzzification instructions for reducing the plurality of program outputs to a single resulting output; and downloading the set of knowledge base data organized in a plurality of tables and the set of instruction codes for invoking the microprocessor-level instructions stored in the programmable controller.

3. The method of claim 1, wherein the displaying of rungs with a plurality of input instructions displays a fuzzy logic "AND" function between the plurality of input instructions.

4. The method of claim 1, wherein the displaying of links between parallel rung branches displays a fuzzy logic "OR" function.

5. The method of claim 1, wherein the displaying of fuzzy logic input instructions further comprises displaying a symbol "/F\" distinguishing the fuzzy logic input instructions from other ladder diagram instructions, and wherein the displaying of the fuzzy logic output instructions further comprises displaying the symbol "\D/" for defuzzification.

6. The method of claim 1, further comprising the step of identifying the input variables and membership functions by alphanumeric labels.

7. The method of claim 1, wherein the translating step further comprises compiling the ladder diagram program to generate a lop program in a source code in another programming language; and compiling the source code into an executable code for a microprocessor in the programmable controller processor.

8. The method of claim 7, wherein the step of compiling the ladder diagram into the source code further comprises compiling the ladder diagram into instructions in the C programming language.

9. A method of operating a programming computer to display a controllable program based on fuzzy logic for downloading and execution in a programmable controller processor, the method comprising:

in response to a plurality of user inputs, displaying on the screen of the programming computer a ladder diagram graphical display representing a programmable controller program based on fuzzy logic, wherein the displaying step further comprises a) displaying fuzzy logic program input instructions with an input variable related to data in a programmable controller data table, an input membership function and an actual value representing evaluation of the input data with respect to a respective input membership function;

b) displaying fuzzy logic program output instructions with an output variable related to data in a programmable controller data table, an output membership function and an actual value representing a contribution of a respective output membership function to a resulting output;

c) displaying portions of rungs representing control rules for associating input instructions with each other and for associating input instructions with a related output instruction; and d) displaying links between parallel rung branches representing control rules for relating the contributions of the respective output membership functions in parallel rung branches to an individual result; and compiling the displayed program based on fuzzy logic into first and second portions, the first portion comprising a loop program for execution in the programmable controller and the second portion comprising knowledge base data organized in a plurality of tables for access during execution of the loop program.

10. The method of claim 9, further comprising the step of downloading the loop program and the knowledge base data to a programmable controller processor; and further comprising the step of executing the loop program in the programmable controller to access the knowledge base data and carry out the ladder diagram program based on fuzzy logic.

11. The method of claim 9, further comprising the step of programming the programmable controller processor with an instruction to initiate execution of the loop program and with an instruction to return from the loop program upon completion of the execution of the ladder diagram program based on fuzzy logic; and further comprising the step of executing instruction to initiate execution of the loop program during execution of a ladder diagram program based on Boolean logic.

12. A method of entering a controller program based on fuzzy logic for downloading and execution in a programmable controller processor, the method comprising:

in response to a plurality of user inputs, displaying on the screen of the programming computer a programmable controller program based on fuzzy logic, wherein the displaying step further comprises a) in response to user inputs, displaying a plurality of propositions, membership functions and input data variables and output data variables for executing fuzzy logic operations; and b) in response to user inputs, displaying a plurality of inference instructions to generate a plurality of program outputs;

storing a set of instructions for execution in the programmable controller to evaluate membership functions, to apply inference instructions and to generate an individual output from a plurality of program outputs;

translating the displayed program based on fuzzy logic to knowledge base data organized in a plurality of tables for access during execution of the set of instructions in the programmable controller; and storing the set of instructions and the knowledge base data for execution in the programmable controller.

13. The method of claim 12, wherein the displaying step further comprises displaying the programmable controller program based on fuzzy logic as a ladder diagram program.

14. The method of claim 12, wherein the storing step further comprises downloading a first portion of the knowledge base data from a first programming computer to a programmable controller, and downloading a second portion of the knowledge based data and the set of instructions from a second programming computer to the programmable controller.

15. A method of entering a controller program based on fuzzy logic for a programmable controller that controls outputs in response to inputs on a controlled system, the method comprising:

in response to a plurality of user inputs to a programming computer, displaying on the screen of the programming computer a ladder diagram graphical display representing a programmable controller program based on fuzzy logic, wherein the displaying step further comprises a) displaying a plurality of propositions, membership functions and input data variables for executing fuzzy logic operations;

b) displaying a plurality of inference instructions to generate a plurality of program outputs; and c) displaying a plurality of defuzzification instructions for reducing the plurality of program outputs to a single resulting output; and translating the programmable controller program based on fuzzy logic into first and second portions, the first portion comprising a coded program and the second portion comprising knowledge base tables which are executable by a microprocessor within a programmable controller processor.

16. The method of claim 15, further comprising the step of downloading the coded program and knowledge base tables to a programmable controller.

17. The method of claim 16, further comprising the step of programming the programmable controller with an instruction to invoke and execute the translated programmable controller program based on fuzzy logic, and with an instruction to return from execution of the coded program based on fuzzy logic to execute other ladder diagram instructions.

* * * * *

UNITED STATES PATENT AND TRADEMARK OFFICE
CERTIFICATE OF CORRECTION

PATENT NO. : 5,285,376

DATED : Feb. 8, 1994

INVENTOR(S) : Struger, et al.

It is certified that error appears in the above-identified patent and that said Letters Patent is hereby corrected as shown below:

Col. 3, Line 42 before "the program" insert --because--

Col. 4, Line 64 after "to 1.0" insert --,--

Col. 5, Line 51 after "of truth" insert --.--

Col. 6, Line 57 after "power," insert --the weighted--

Col. 10, Line 34 after "label" insert --.--

Col. 21, Line 57 (Claim 7) replace "lop" with --loop--

Col. 22, Line 52 (Claim 11) after "executing" insert --the--

Signed and Sealed this

Ninth Day of August, 1994

Attest:

BRUCE LEHMAN

Attesting Officer

Commissioner of Patents and Trademarks